US010503209B2

United States Patent
Kapinos et al.

(10) Patent No.: US 10,503,209 B2
(45) Date of Patent: Dec. 10, 2019

(54) ELECTRONIC DEVICE WITH STRUCTURAL LAYER

(71) Applicant: Lenovo (Singapore) Pte. Ltd., Singapore (SG)

(72) Inventors: Robert James Kapinos, Durham, NC (US); Russell Speight VanBlon, Raleigh, NC (US); Scott Wentao Li, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 15/240,082

(22) Filed: Aug. 18, 2016

(65) Prior Publication Data

US 2018/0052491 A1 Feb. 22, 2018

(51) Int. Cl.
*G06F 1/16* (2006.01)
*G06F 1/18* (2006.01)

(52) U.S. Cl.
CPC .......... *G06F 1/1637* (2013.01); *G06F 1/1616* (2013.01); *G06F 1/1626* (2013.01); *G06F 1/1658* (2013.01); *G06F 1/18* (2013.01); *G06F 1/183* (2013.01)

(58) Field of Classification Search
CPC ........ G06F 1/1637; H05K 7/023; H05K 7/06; H05K 1/0298; H05K 1/0306; H05K 1/14; H05K 1/141; H05K 1/142; H05K 1/144; H05K 1/145; H05K 1/182
See application file for complete search history.

(56) References Cited

U.S. PATENT DOCUMENTS

| 3,638,573 A * | 2/1972 | Campbell ................. B32B 3/12 102/364 |
| 4,689,442 A * | 8/1987 | Ozaki ....................... B32B 3/12 174/266 |
| 6,370,038 B1 | 4/2002 | Miyake et al. |
| 7,507,461 B2 * | 3/2009 | Wang ....................... B32B 3/12 156/307.3 |
| 8,922,983 B1 | 12/2014 | Owen et al. |

(Continued)

FOREIGN PATENT DOCUMENTS

| CN | 101754617 A | 6/2010 |
| CN | 102598888 A | 7/2012 |

(Continued)

OTHER PUBLICATIONS

Rao et al., Strength analysis on honeycomb sandwich panels of different materials, International Journal of Engineering Research and Applications, vol. 2, Issue 3, May-Jun. 2012, pp. 365-374 (10 pages).

(Continued)

*Primary Examiner* — Hoa C Nguyen
(74) *Attorney, Agent, or Firm* — Brian J. Pangrle

(57) ABSTRACT

A device can include a structural layer; a first glass-reinforced epoxy circuit board mounted to one side of the structural panel; a second glass-reinforced epoxy circuit board mounted to an opposing side of the structural panel; components where the components include a processor, memory operatively coupled to the processor and a display operatively coupled to the processor; and a housing material supported by the structural layer.

20 Claims, 15 Drawing Sheets

(56) References Cited

U.S. PATENT DOCUMENTS

| | | | |
|---|---|---|---|
| 2001/0031379 A1* | 10/2001 | Tera | H01L 51/5253 428/690 |
| 2008/0150815 A1 | 6/2008 | Nakahata et al. | |
| 2009/0290089 A1 | 11/2009 | Ichioka et al. | |
| 2011/0031379 A1 | 2/2011 | Ishigami et al. | |
| 2011/0110063 A1 | 5/2011 | Sauers | |
| 2011/0255259 A1 | 10/2011 | Weber et al. | |
| 2012/0127639 A1 | 5/2012 | Lai | |
| 2012/0279048 A1 | 11/2012 | Sauers | |
| 2012/0281381 A1 | 11/2012 | Sanford et al. | |
| 2013/0215551 A1* | 8/2013 | Bowers | H01G 4/005 361/301.1 |
| 2014/0268602 A1* | 9/2014 | Adamik | F24F 11/30 361/758 |
| 2015/0022986 A1* | 1/2015 | Steuer | H05K 9/0022 361/767 |
| 2016/0109906 A1 | 4/2016 | Trutna et al. | |
| 2016/0203910 A1* | 7/2016 | Bowers | H01G 4/005 361/305 |
| 2017/0336829 A1 | 11/2017 | Sanford et al. | |

FOREIGN PATENT DOCUMENTS

| | | |
|---|---|---|
| CN | 103827772 A | 5/2014 |
| CN | 204305092 U | 4/2015 |
| CN | 204406267 A | 6/2015 |
| CN | 204406267 U | 6/2015 |
| WO | 2008 142918 A1 | 11/2008 |
| WO | 2016 061019 A1 | 4/2016 |

OTHER PUBLICATIONS

Haugan et al., Characterization of the material properties of two FR4 printed circuit board laminates, Norwegian Defence Research Establishment (FFI), Jan. 10, 2014, FFI-rapport 2013/01956 (40 pages).

Paik et al., The strength characteristics of aluminum honeycomb sandwich panels, Thin-Walled Structures 35 (1999) 205-231 (27 pages).

HexWeb Honeycomb sandwich design technology, Dec. 2000, Publication No. AGU 075b (28 pages).

Foo et al., Mechanical properties of Nomex material and Nomex honeycomb structure, Composite Structures 80 (2007) 588-594 (8 pages).

Chapter 7, Advanced Composite Materials, 2013 (58 pages).

The Gund Company, Material Data Sheet NEMA Grade FR4 Glass Epoxy Laminate, 2011 (2 pages).

Khomane et al., Mechanical Characterization of Carbon Fiber/ EPOXY Composites With Variable Volume Fraction, International Advanced Research Journal in Science, Engineering and Technology 2nd International Conference on Advances in Mechanical Engineering (ICAME-2016), vol. 3, Special Issue 1, Mar. 2016 (5 pages).

Jan et al., Flexural strength of honey comb sandwich structures, Int. Journal of Applied Sciences and Engineering Research, vol. 4, Issue 1, 2015 (8 pages).

Hess et al., Uncertainties in material strength, geometric, and load variables, 2004 (54 pages).

Haghpanah et al., Buckling of regular, chiral and hierarchical honeycombs under a general macroscopic stress state, Proc. R. Soc. A 470: 20130856, 2014 (23 pages).

Corning, Gorilla Glass 3, brochure Rev: F_090315, 2015 (2 pages).

EP Appl. No. 17 185 172.8-1879, European Search Report, dated Dec. 20, 2017 (3 pages).

EP Appl. No. 17 185 172.8-1221, Extended European Search Report, dated Jan. 19, 2018 (8 pages).

GB Appl. No. 17 126 60.8, GB Examination Report & Search Report, dated Nov. 28, 2017 (7 pages).

GB Appl. No. 17 126 60.8, GB Examination Report, dated Dec. 14, 2018 (5 pages).

EP Appl. No. 17 185 172.8-1879, EPO Communication dated Mar. 7, 2019, referencing US 2008150815 A1 (4 pages).

Sood and Pecht, Printed Circuit Board Laminates, Wiley Encyclopedia of Composites, Second Edition. Edited by Luigi Nicolais and Assunta Borzachiello, 2012 John Wiley & Sons, Inc. pp. 1-11, publication Sep. 15, 2011 (11 pages).

CN (CNIPA/SIPO) Office Action dated Jun. 21, 2019 for CN Appl. No. CN201710575065 (8 pages).

* cited by examiner

ELECTRONIC DEVICE WITH STRUCTURAL LAYER

TECHNICAL FIELD

Subject matter disclosed herein generally relates to electronic devices.

BACKGROUND

An electrical device can include electrical components mounted on a printed circuit board.

SUMMARY

A device can include a structural layer; a first glass-reinforced epoxy circuit board mounted to one side of the structural panel; a second glass-reinforced epoxy circuit board mounted to an opposing side of the structural panel; components where the components include a processor, memory operatively coupled to the processor and a display operatively coupled to the processor; and a housing material supported by the structural layer. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
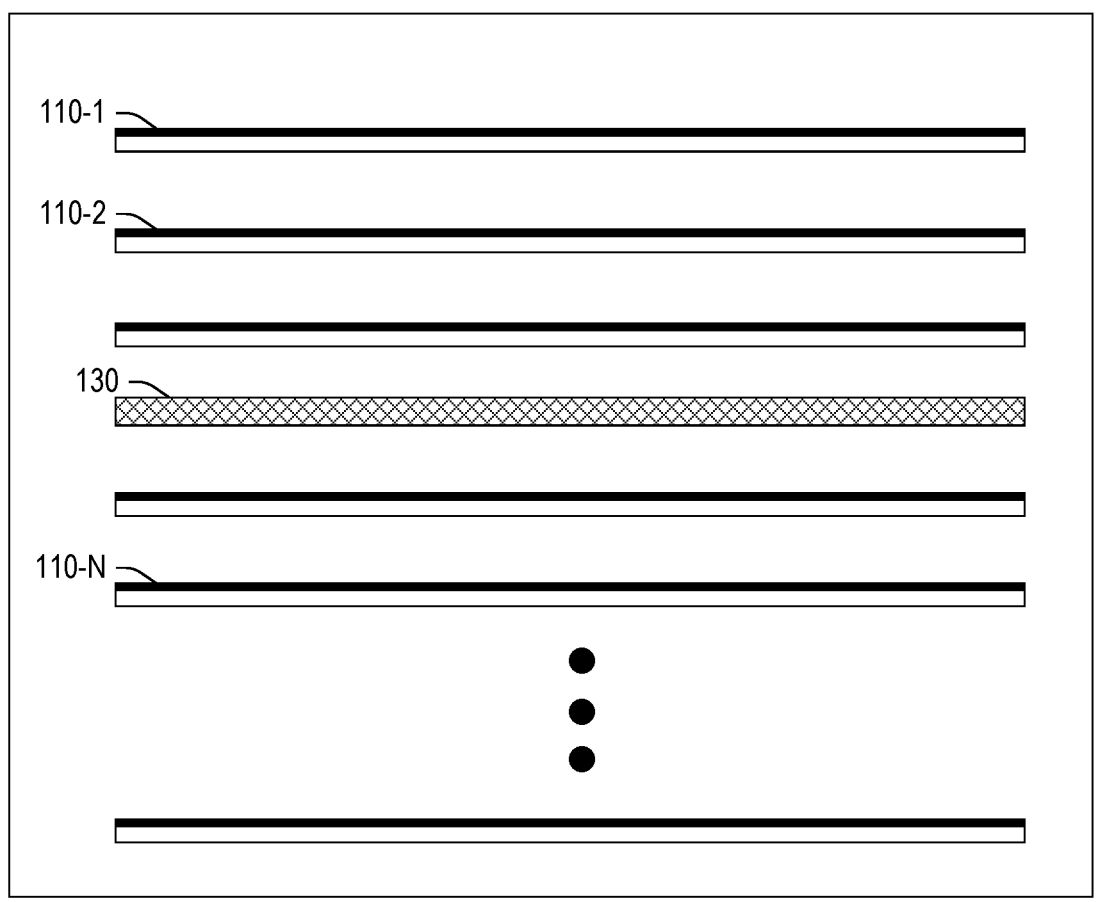
FIG. 1 is a diagram of examples of layered structures.
Figure 1:
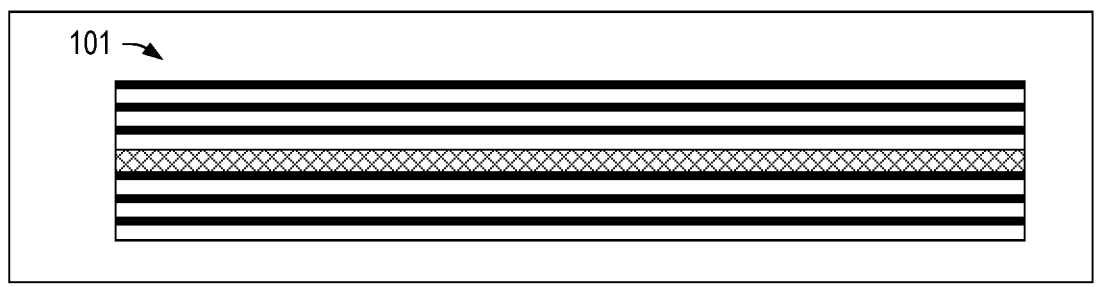
Figure 1:
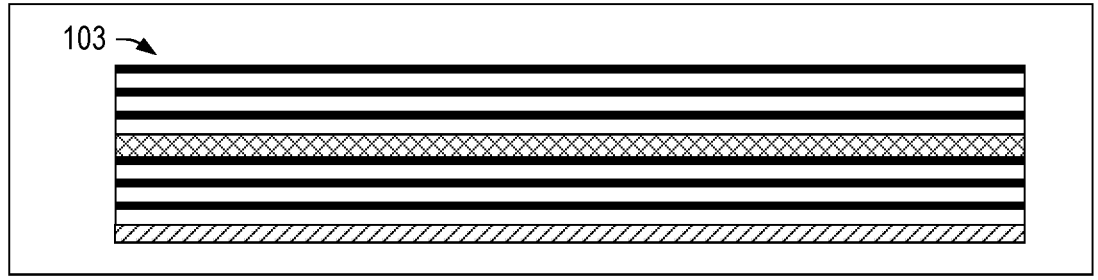

The following description includes the best mode presently contemplated for practicing the described implementations. This description is not to be taken in a limiting sense, but rather is made merely for the purpose of describing general principles of various implementations. The scope of invention should be ascertained with reference to issued claims.

FR4 is a grade designation assigned to glass-reinforced epoxy laminate sheets that find use as a support substrate in printed circuit boards (PCB). FR4 is a composite material composed of woven fiberglass cloth with an epoxy resin binder that is flame resistant (self-extinguishing), hence the letter "FR", which stands for flame retardant. FR4 is a thermoset plastic laminate grade material with electrical insulating properties. FR4 was created from the constituent materials (epoxy resin, woven glass fabric reinforcement, brominated flame retardant, etc.) by NEMA in 1968. Other grade designations for glass epoxy laminates include: G10, G11, FR4, FR5 and FR6. Table 1 below, lists various parameters and values for FR4 where abbreviations LW (lengthwise, warp yarn direction) and CW (crosswise, fill yarn direction) refer to the perpendicular fiber orientations in the XY plane of a board (in-plane). In terms of Cartesian coordinates, lengthwise can be along the x-axis and crosswise can be along the y-axis where the z-axis can be a through-plane direction (e.g., thickness).

TABLE 1

FR4 Example Data

| Parameter | Value |
|---|---|
| Specific gravity/density | 1.850 g/cm$^3$ (3,118 lb/cu yd) |
| Water absorption | −0.125 in < 0.10% |
| Temperature index | 140° C. (284° F.) |
| Thermal conductivity, through-plane | 0.29 W/(m · K), 0.343 W/(m · K) |
| Thermal conductivity, in-plane | 0.81 W/(m · K), 1.059 W/(m · K) |
| Rockwell hardness | 110 M scale |
| Bond strength | >1,000 kg (2,200 lb) |
| Flexural strength (A; 0.125 in) - LW | >415 MPa (60,200 psi) |
| Flexural strength (A; 0.125 in) - CW | >345 MPa (50,000 psi) |
| Dielectric breakdown (A) | >50 kV |
| Dielectric breakdown (D48/50) | >50 kV |
| Dielectric strength | 20 MV/m |
| Relative permittivity (A) | 4.8 |
| Relative permittivity (D24/23) | 4.8 |
| Dissipation factor (A) | 0.017 |
| Dissipation factor (D24/23) | 0.018 |
| Dielectric constant permittivity | 4.70 max., 4.35 @ 500 MHz, 4.34 @ 1 GHz |
| Glass transition temperature | >100° C. |
| Young's modulus - LW | 3.5 × 10$^6$ psi (24 GPa) |

TABLE 1-continued

FR4 Example Data

| Parameter | Value |
|---|---|
| Young's modulus - CW | $3.0 \times 10^6$ psi (21 GPa) |
| Coefficient of thermal expansion - x-axis | $1.4 \times 10^{-5}$ K$^{-1}$ |
| Coefficient of thermal expansion - y-axis | $1.2 \times 10^{-5}$ K$^{-1}$ |
| Coefficient of thermal expansion - z-axis | $7.0 \times 10^{-5}$ K$^{-1}$ |
| Poisson's ratio - LW | 0.136 |
| Poisson's ratio - CW | 0.118 |
| LW sound speed | 3602 m/s |
| SW sound speed | 3369 m/s |
| LW Acoustic impedance | 6.64 MRayl |

FR4 thickness may be specified in thou, inches, microns or millimeter. As an example, FR4 thicknesses may range from about 10 thou (0.010 in, 254 micron) to about 3 inches (76 mm).

FIG. 1 shows examples of layered structures 101 and 103 where each of the layered structures 101 and 103 includes at least one printed circuit board (PCB) 110-1 to 110-N and at least one structural panel 130.

As an example, a structural panel can be or include a material that has one or more characteristics (e.g., material properties) that are in excess (e.g., greater than) of one or more of those of FR4. For example, consider a material that is characterized by a modulus of elasticity (e.g., Young's modulus) that is in excess of about 50 GPa. As an example, a material may be selected from a material listed in Table 2, below, where the E value in GPa is in excess of about 100 GPa or, for example, in excess of about 140 GPa or, for example, in excess of about 179 GPa or, for example, in excess of about 193 GPa.

TABLE 2

Plain Carbon and Low Alloy Steels

| Metal | E (GPa) |
|---|---|
| Steel Alloy A36 | 207 |
| Steel Alloy 1020 | 207 |
| Steel Alloy 1040 | 207 |
| Steel Alloy 4140 | 207 |
| Steel Alloy 4340 | 207 |
| Stainless Steels | |
| Alloy 304 | 193 |
| Alloy 316 | 193 |
| Alloy 405 | 200 |
| Alloy 440A | 200 |
| Alloy 17-7PH | 204 |
| Other | |
| Nickel 200 | 204 |
| Inconel 625 | 207 |
| Monel 400 | 180 |
| Haynes Alloy 25 | 236 |
| Invar | 141 |
| Super Invar | 144 |
| Kovar | 207 |
| Chemical Lead | 13.5 |
| Antimonial lead (6%) | 44.3 |
| Tin (Commercially pure) | 30 |
| Lead - tin solder (60Sn - 40 Pb) | 104.5 |
| Zinc (Commercially pure) | 99.3 |

As to flexural strength of FR4, the International Electrotechnical Commission (IEC) specifies 340 MPa LW and 170 MPa CW. Values of commercially available materials may be of about 450 MPa to about 550 MPa LW and CW approximately proportionally less.

As an example, a material of a structural layer may include a carbon-based material such as carbon fiber. As an example, carbon fiber may be utilized to form a structural layer with a flexural strength in excess of about 1 GPa. As an example, a structural layer that includes carbon fiber may be direction or may be constructed to be relatively homogenous (e.g., more than two orientations, etc.). As an example, carbon fibers may be of lengths that are less than width or length of a structural layer (e.g., composite material of short lengths of randomly or otherwise oriented carbon fibers).

As an example, a material of a structural layer may include a titanium (Ti) alloy, which may be formed to have a flexural strength in excess of about 1 GPa.

As an example, a material of a structural layer can include a tensile strength greater than about $50 \times 10^9$ Pa in its highest direction.

Figure 3:
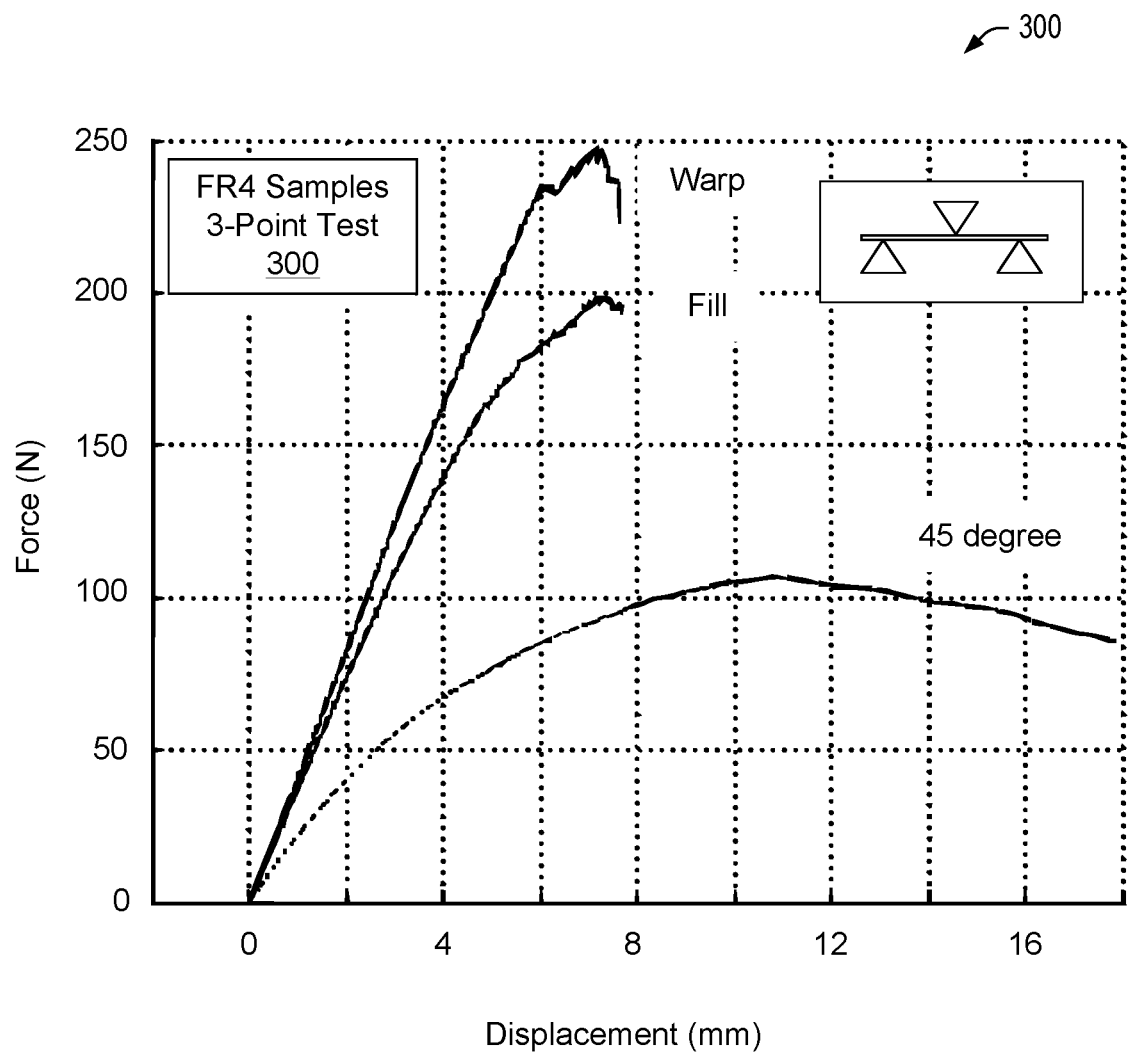
FIG. 3 is a plot of force versus displacement for FR4 samples.

As an example, for a homogeneous material, a value for flexural strength may be approximately the same as a value for tensile strength. As an example, a material may be utilized as a structural layer where the material is substantially homogeneous in planar directions of the structural layer (e.g., compared to FR4, which as shown in FIG. 3 is inhomogeneous in planar directions). As an example, a structural layer that is substantially homogeneous (e.g., consider a metal, an alloy, random fibers, etc.) may be more amenable to quality control testing when such a structural layer is utilized in an electronic device. In such an example, the electronic device may be utilized by a user with more certainty as to loads that can be handled by the electronic device with minimal risk of damage; whereas, for a material such as FR4, maximum load can depend on orientation of fibers and the type of damage can depend on layout of circuits, components, etc. with respect to orientation of fibers.

As an example, where a warning is included with a manual, marketing material, etc., the use of a structural layer that can be quality control tested for possible, foreseeable conditions as to load with greater certainty than a material such as FR4 can be beneficial to an end user, a manufacturer, insurer, insured, etc.

As an example, a structural layer that is stronger than FR4 can be utilized as a structural support for a circuit board that relies on FR4. In such an example, the structural layer can help to assure that displacement (e.g., flexing) of the FR4 under load is minimized as load can be carried by (e.g., transferred to) the structural layer. Further, as mentioned, such an approach can help to minimize unknowns as to orientation of load with respect fiber orientation in FR4, particularly where the structural layer is more homogenous than FR4 (e.g., with respect to structure and associated mechanical properties, etc.).

As an example, a device can include a structural layer, which may be, for example, a structural panel. Such a layer may be integrated into a device as a core for working components of the device (e.g., electronic devices, PC boards, batteries, screens, etc.). As an example, a structural layer (e.g., a matrix, a lattice, a laminate, etc.) can include one or more rigid materials. As an example, a structural layer can be laminated into one or more layers of one or more boards, for example, onto a surface or surfaces. As an example, wires to one or more peripheral ports, sensors, etc., may pass through holes, channels, grooves, etc., in a structural layer and/or may exit an edge or edges.

As an example, a device can include one or more covers made of structural materials that are attached to a structural layer (e.g., directly). In such an example, a cover or covers may aim to keep out dust, protect surfaces of components, reduce shock upon impact, and/or provide aesthetics and/or ergonomics. As an example, an external cover can be metallized to act as a faraday cage around various electronics (e.g., components, circuits, etc.).

Figure 2:
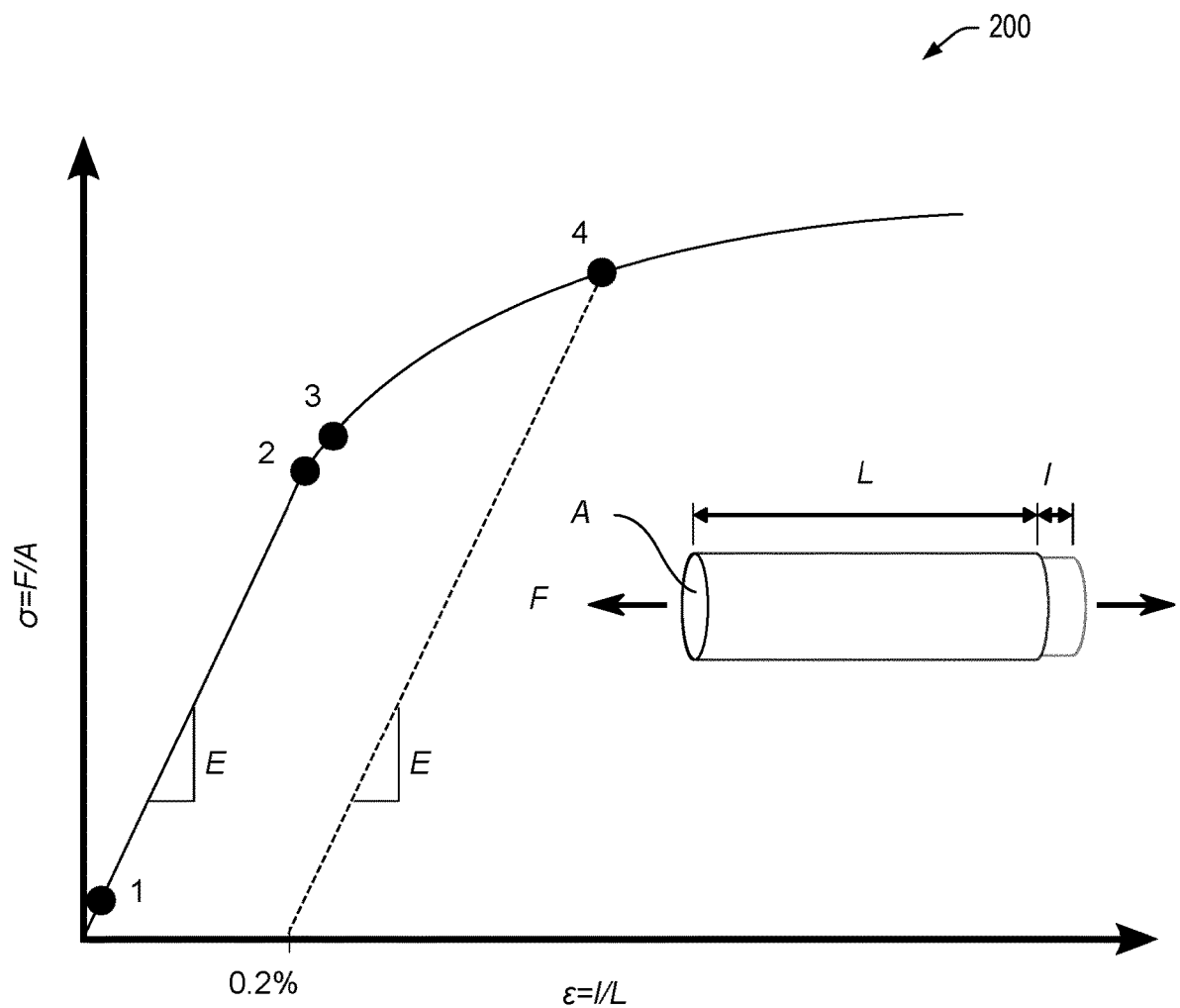
FIG. 2 is a plot of stress versus strain.

FIG. 2 shows a stress-strain curve plot 200 with an example of yield behavior for characteristic of nonferrous alloys where stress a is defined as force per unit area and is plotted as a function of strain $\epsilon$, which is defined as an incremental change in a value of a dimension with respect to an initial value for that dimension. Points labeled in the plot 200 include 1, the true elastic limit, 2, the proportionality limit, 3, the elastic limit and 4, the offset yield strength. In the plot 200, the slope is labeled E, which is the Young's modulus or elastic modulus of the material being tested.

As to the proportionality limit (point 2), up to this amount of stress, stress tends to be proportional to strain (e.g., consider Hooke's law). Thus, data may be fit using a linear model where the slope of the stress-strain data is an estimate of the elastic modulus of the material. As to the elastic limit (point 3), this is referred to as the yield strength where, beyond the yield strength, permanent deformation will occur. The elastic limit is therefore the lowest stress at which permanent deformation can be measured. Precise strain measurements have shown that plastic strain can begin at low stresses. Some metals, such as mild steel, reach an upper yield point before dropping rapidly to a lower yield point. The material response tends to be linear up until the upper yield point, but the lower yield point is used in structural engineering as a conservative value.

Material may be characterized using one or more of various types of tests. For example, a machine marketed under the brand INSTRON™ (Norwood, Mass.) may be used where such a machine is designed to evaluate the mechanical properties of materials and components.

One test is known as the three-point bending flexural test or 3-point loading test, which can provide values for the modulus of elasticity in bending $E_f$, flexural stress $\sigma_f$, flexural strain $\epsilon_f$, and the flexural stress-strain response of the material.

FIG. 3 shows a force versus displacement plot 300 for FR4 samples using the 3-point loading test for flexural strength, flexural strain and elastic modulus. Specifically, the plot 300 shows load as function of displacement and orientation for three low-Tg (glass transition temperature) FR4 material samples where each sample had a thickness of approximately 1.6 mm and a width of approximately of 12 mm to approximately 16 mm. The flexural strength and strain can be calculated based on the load at failure, the geometry of the sample and boundary conditions given by the 3-point loading test. The elastic modulus can be calculated based on the linear part of the plot. For low-Tg and high-Tg material, the warp orientation has the highest values. The load when failure occurs can be quite dependent on small flaws that cause high stress concentrations and, as such, flexural strength and strain may be problematic to assess, which can weigh against use of FR4 as a structural material. In the plot 300, the 45 degree orientation is more compliant than the warp and fill direction as exhibited by the shape of the force versus displacement curve. As a result, the 45 degree orientation samples flexed and did not fail for the forces and displacements of the plot 300.

As mentioned, FR4 may be problematic to assess as to its material properties, for example, due to dependence on factors such as small flaws, which may result in localized regions of high stress concentration. Further, as indicated in the plot 300, some properties can be quite dependent on direction of applied force with respect to warp, fill and off-warp or off-fill orientations of FR4. While FR4 has particular properties that can be suitable for use as printed circuit boards, FR4 exhibits properties that can give rise to quality control issues and/or performance issues (e.g., due to defects, orientation, etc.).

For the approximately 1.6 mm thick FR4 samples, flexural strength values were estimated and found to be less than about 700 MPa and modulus of elasticity was found to be less than about 25,000 MPa (e.g., 25 GPa) (see, e.g., Haugen et al., "Characterization of the material properties of two FR4 printed circuit board laminates", Norwegian Defence Research Establishment (FFI), January 2014 (FFI-rapport 2013/01956), which is incorporated by reference herein).

As shown in the plot 300 of FIG. 3, the 1.6 mm FR4 samples could withstand a maximum force of about 250 N (e.g., about 25 kilograms force or about 56 pounds force) in the warp direction using the 3-point test. As an example, consider a pocket-sized computing device, a tablet device, etc. where an individual that weighs about 70 kilograms may accidentally sit on the device. If that device were supported by a 1.6 mm FR4 layer as in the plot 300, it is likely that the device would be damaged. Further, the amount and/or type of damage may depend on factors such as small defects in the FR4, orientation of warp, fill, etc.

As shown in the plot 300 of FIG. 3, displacement of about 1 mm occurs at about 50 N (e.g., about 5 kilograms force or about 11 pounds force), such an amount of displacement may be sufficient to disrupt and/or damage one or more features of a PCB that relies on FR4 as a structural support layer.

As an example, a device can include glass such as, for example, GORILLA™ glass (Corning, Corning, N.Y.). Another glass may be XENSATION™ glass (Schott, Louisville, Ky.), which may have a 4-point bending test strength of about 800 MPa or more and may be available in thicknesses of about 0.5 mm to about 3 mm.

Figure 4:
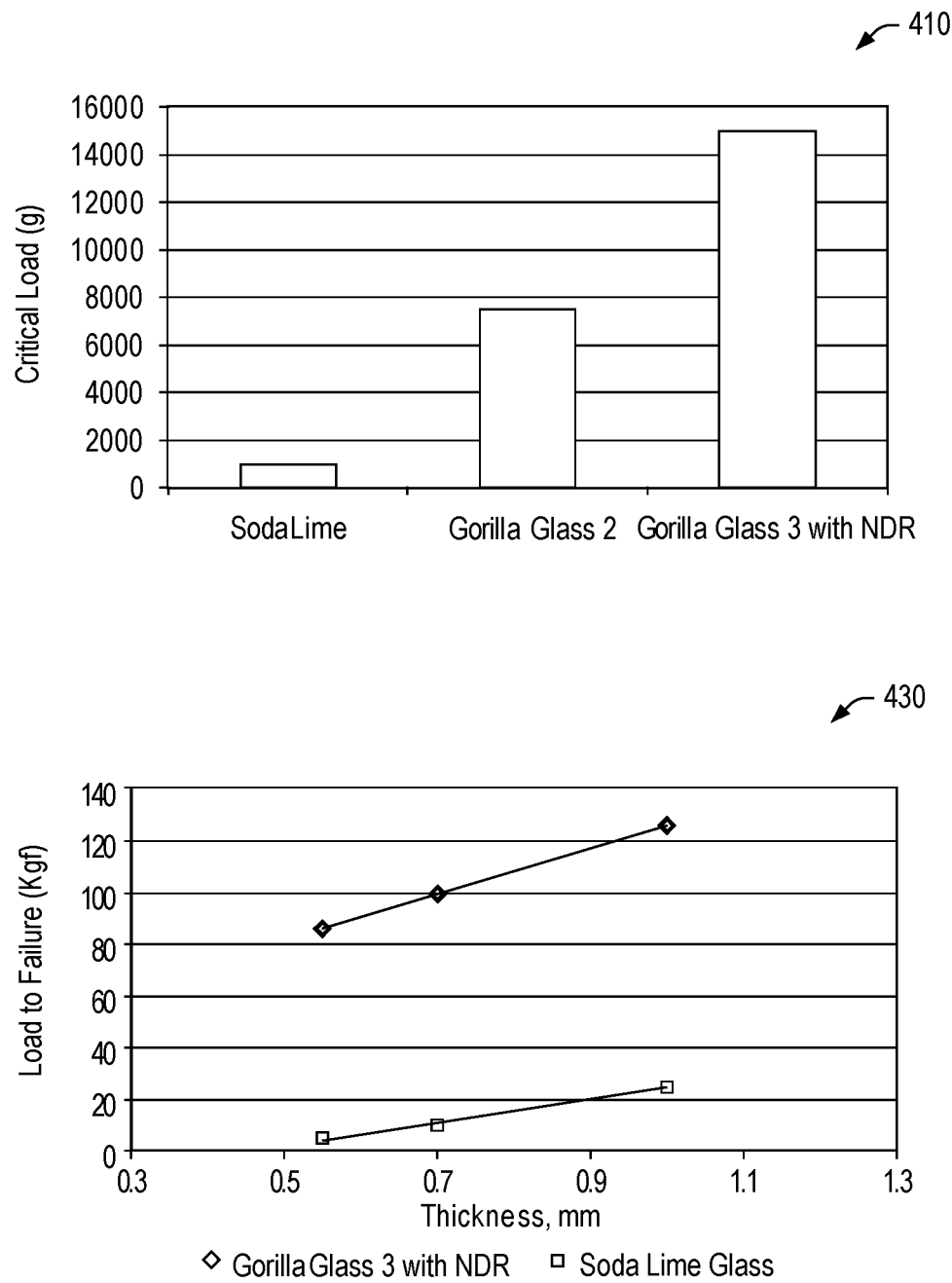
FIG. 4 is a series of plots for mechanical properties of display glass.

FIG. 4 shows plots 410 and 430 for GORILLA™ glass where the plot 410 shows critical load in grams being at about 14,000 (14 kg) for the GORILLA™ glass 3 sample and where the plot 430 shows load to failure as increasing with thickness noting that a 1 mm thick sample has a load to failure of about 120 kgf; whereas, the soda lime glass that has a thickness of about 1 mm has a load to failure of about 20 kgf.

Per the data of FIG. 3 and FIG. 4, an FR4 layer and/or a glass can be damaged where such damage may be damage to circuitry of a FR4 printed circuit board and/or damage to the glass (e.g., cracking, breaking, etc.).

As an example, a computing device can include an internal structural layer that functions as a main support structure for the computing device. In such an example, the structural layer may include a PCB coupled to one side and, for example, another PCB coupled to an opposing side. In such examples, one or more PCBs may be, for example, one or more FR4-based PCBs or, for example, one or more non-FR4-based PCBs. As to the latter, the structural layer may optionally allow for use of a PCB that is thinner, lighter, etc. For example, consider a film based PCB where layers of films may include circuits, etc.

As an example, a device that includes an arrangement of layers that include a structural layer may include a shell fixed to the structural layer where, for example, the shell may be a thin layer of material. As an example, a shell may be formed as a thermoset or thermoplastic layer that is set or cured in situ. For example, a sub-assembly may be placed in a mold where a thermoset and/or a thermoplastic is introduced and then hardened.

Figure 5:
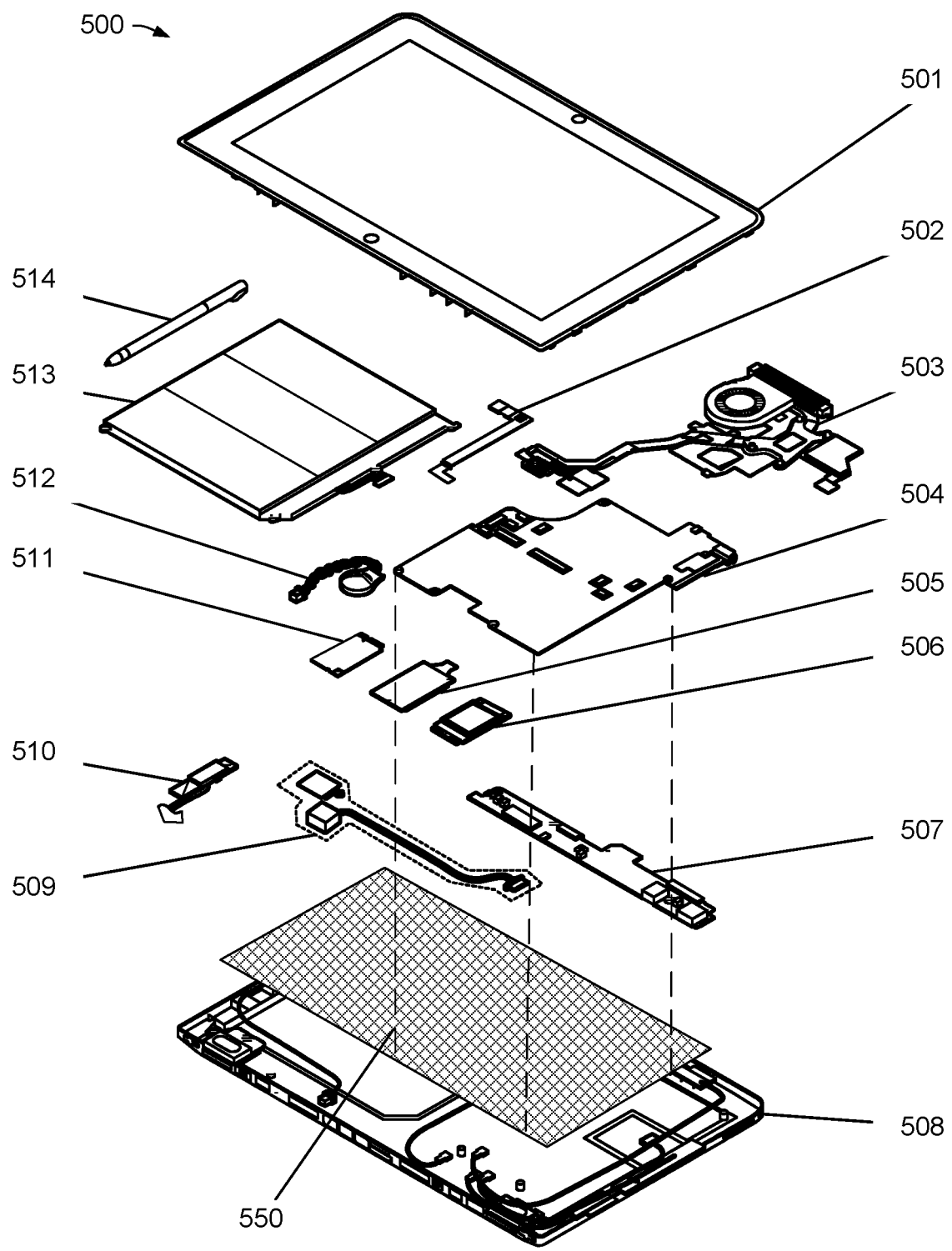
FIG. 5 is an exploded view of an example of an electronic device.

FIG. 5 shows an example of a device 500 that includes an LCD assembly 501, a camera assembly 502, a fan assembly 503, a board 504 (e.g., a circuit board, a system board, a motherboard, etc.), a wireless WAN card 505, a wireless LAN card 506, an I/O board 507, a cover assembly 508, a DC cable assembly 509, a communication card 510, a solid-state drive 511, a battery package 513, a stylus 514 and a structural layer 550 where the board 504 and/or one or more other components may be physically coupled to the structural layer 550 (e.g., to form a layered structure such as the layered structure 101 or the layered structure 103 of FIG. 1). In the example of FIG. 5, the board 504 may include a processor and memory, which may be configured to store instructions accessible by the processor and, for example, executable by the processor to perform one or more tasks.

Figure 6:
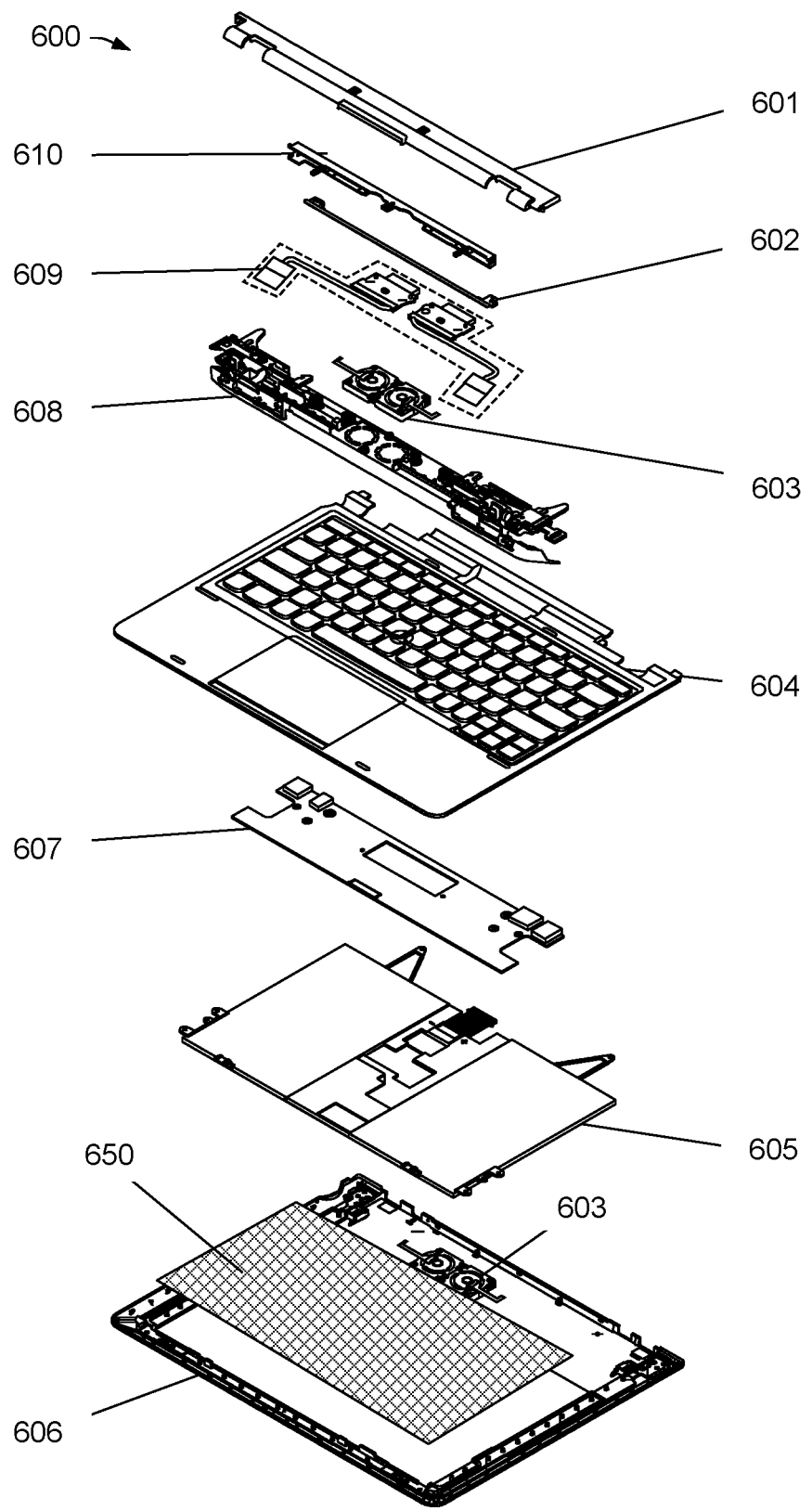
FIG. 6 is an exploded view of an example of an electronic device.

FIG. 6 shows an example of a device 600. As an example, the device 600 may be operatively coupled to the device 600. In the example of FIG. 6, the device 600 includes a cover and hinge assembly 601, a link structure 602, a fan assembly 603, a keyboard assembly 604, a battery package 605, a base cover 606, an I/O board 607, a hinge assembly 608, connectors 609, a connectors cover 610, and a structural layer 650 where components may be physically coupled to the structural layer 650 (e.g., to form a layered structure such as the layered structure 101 or the layered structure 103 of FIG. 1).

Figure 7:
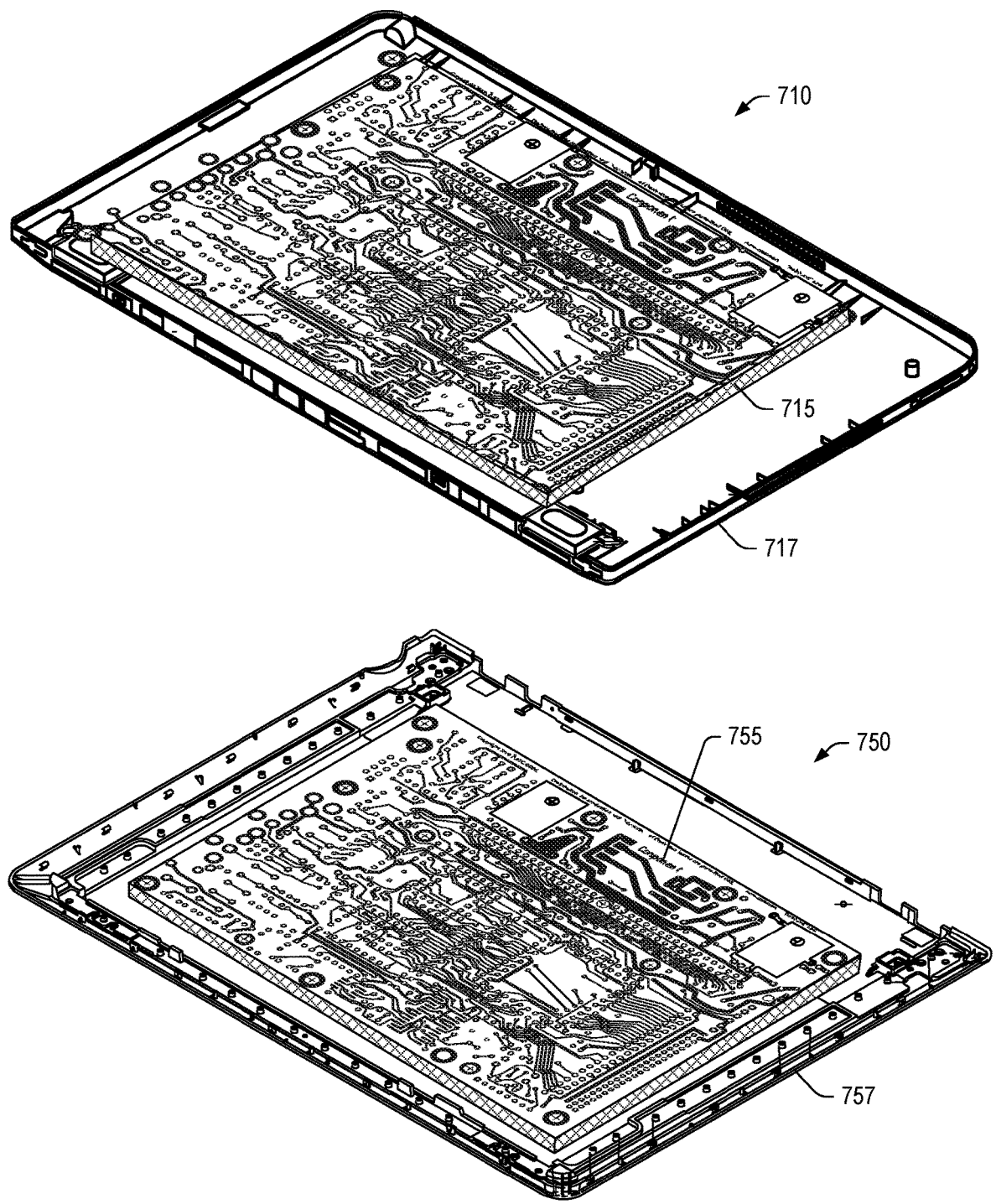
FIG. 7 is a series of views of examples of electronic devices that include at least one structural layer.

FIG. 7 shows example assemblies 710 and 750 that include layered structures 715 and 755, which can be, for example, a layered structure such as the layered structure 101 or the layered structure 103 of FIG. 1. In the examples of FIG. 7, the layered structure 715 can support one or more components and the layered structure 755 can support one or more components. In such examples, a structural layer of the layered structure 715 can be the predominant structural support for a device, which may, for example, support a shell 717 and a structural layer of the layered structure 755 can be the predominant structural support for a device, which may, for example, support a shell 757.

Figure 8:
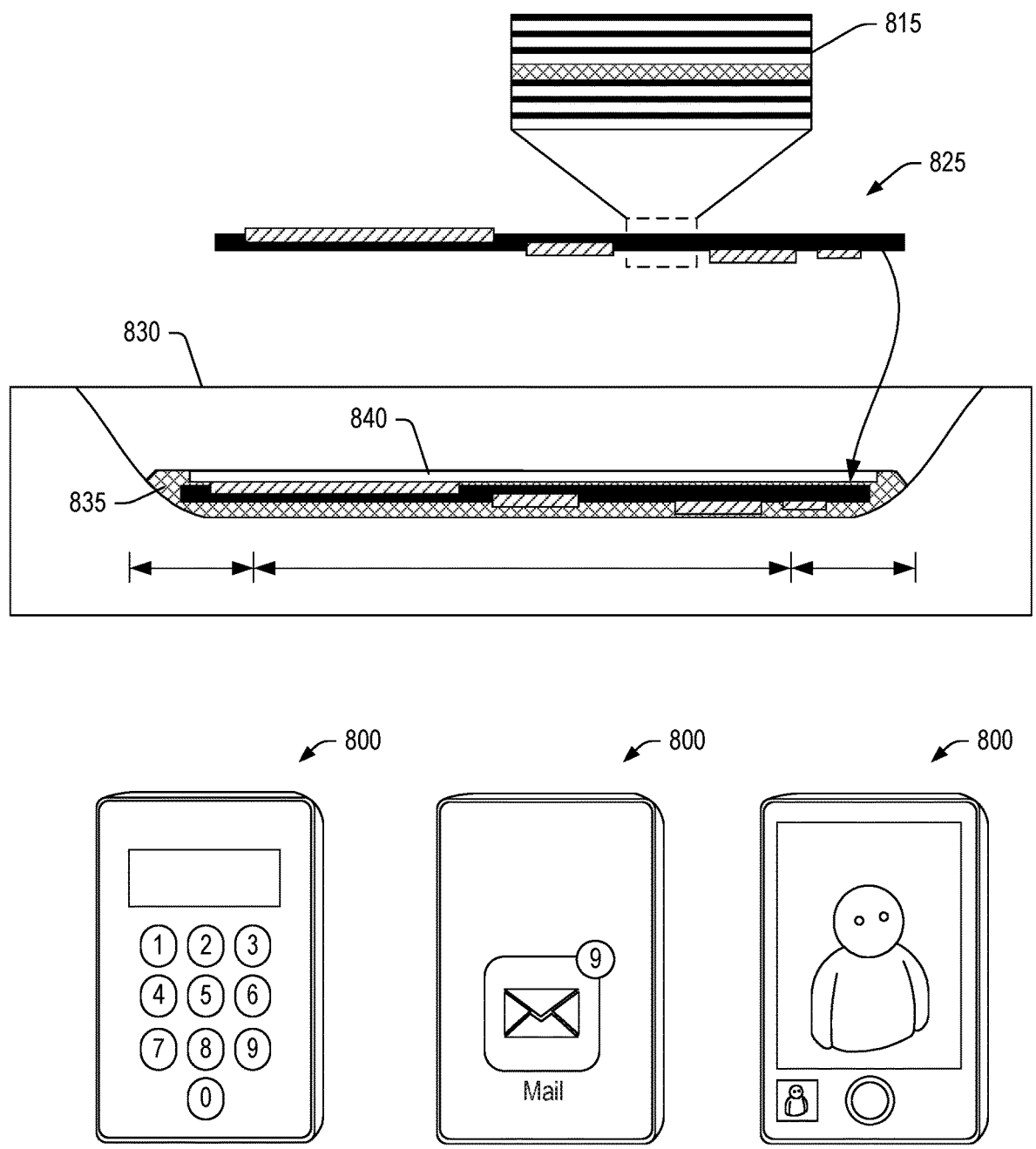
FIG. 8 is a series of views of an example of an electronic device that includes a structural layer.

FIG. 8 shows an example of a device 800 that can include a structural layer 815 that is part of a circuitry structure 825 where the circuitry structure 825 may optionally be set into a polymeric material 835, optionally a polymeric composite material, and where the device 800 can optionally include a display 840, which may be covered by a glass. As shown in the example of FIG. 8, various types of graphical user interfaces may be rendered to the display 840 of the device 800. As an example, the device 800 can include cellular communication circuitry, Internet communication circuitry, camera and/or video circuitry, etc. As an example, the device 800 can include processor-executable instructions stored in a processor-readable storage medium that is not a carrier wave and that is not a signal and that is non-transitory. In such an example, the instructions may be application instructions that instruct the device 800 to render information to the display 840. Where the display 840 is a touch screen display, a user may touch the display 840 such that the device 800 receives the touch or touches as input via sensors of the touch screen display and where one or more commands may be generated as sensor-based output.

Figure 9:
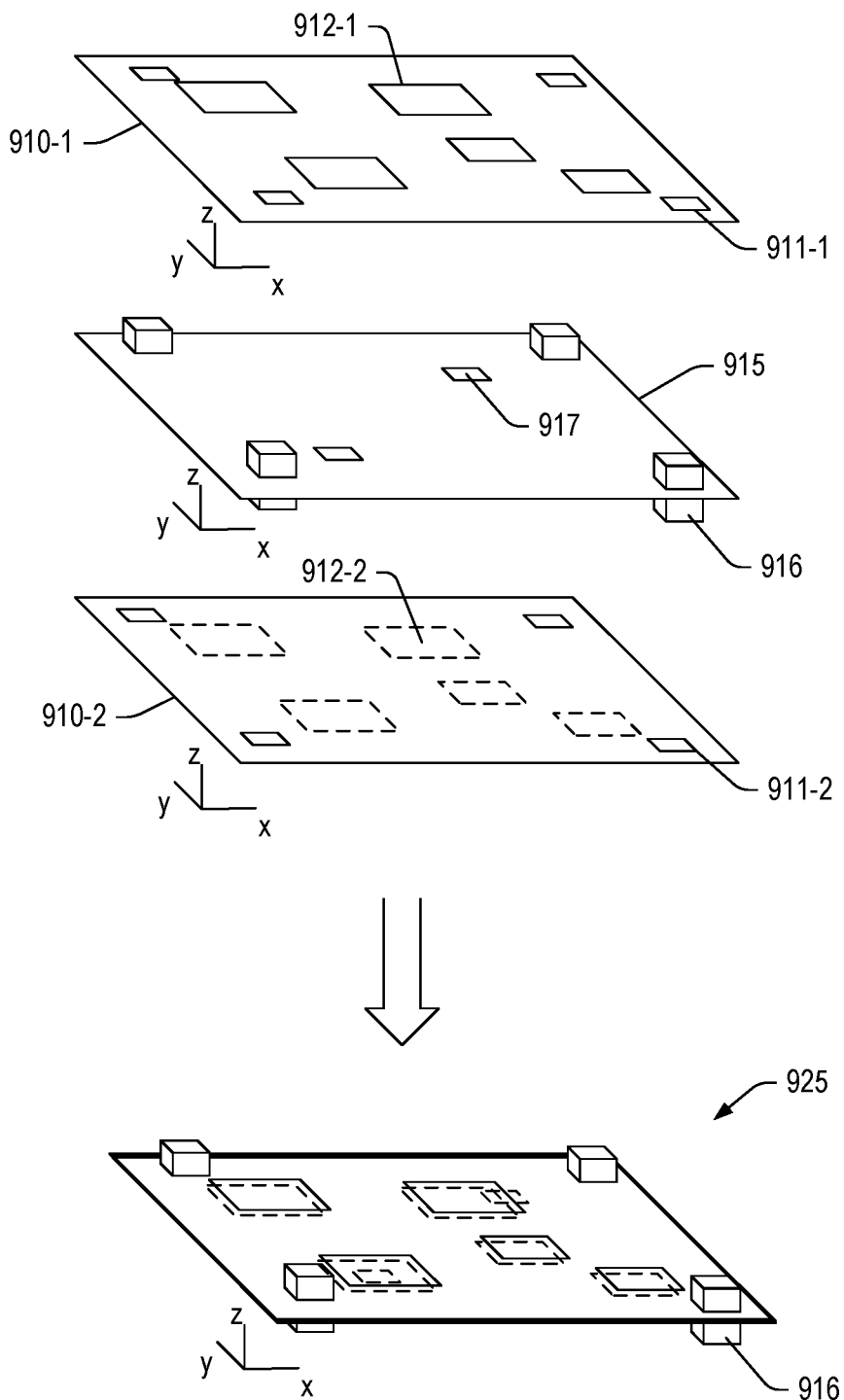
FIG. 9 is a series of views of an example of a circuitry structure that includes a structural layer.

FIG. 9 shows an example, of a circuitry structure 925 that is formed of a plurality of circuit boards 910-1 and 910-2 and a structural layer 915. As shown, the structural layer 915 can include connectors 916 and/or openings 917. As an example, the circuit board 910-1 and/or the circuit board 910-2 can include openings 911-1 and 911-2 and can include components 912-1 and 912-2 (e.g., chips or other electrical components, etc.). In the example of FIG. 9, the circuit board 910-1 is connected to one side of the structural layer 915 and the circuit board 910-2 is connected to an opposing side of the structural layer 915. As shown, the connectors 916 may be accessible, for example, to connect one or more components to the structural layer 915. In such an arrangement the connections may be direct or indirect. For example, the connectors 916 may be extensions of material of the structural layer 915 and/or fittings that are connected to the structural layer 915. In either instance, the connectors 916 are structurally part of or coupled to the structural layer 915.

Figure 10:
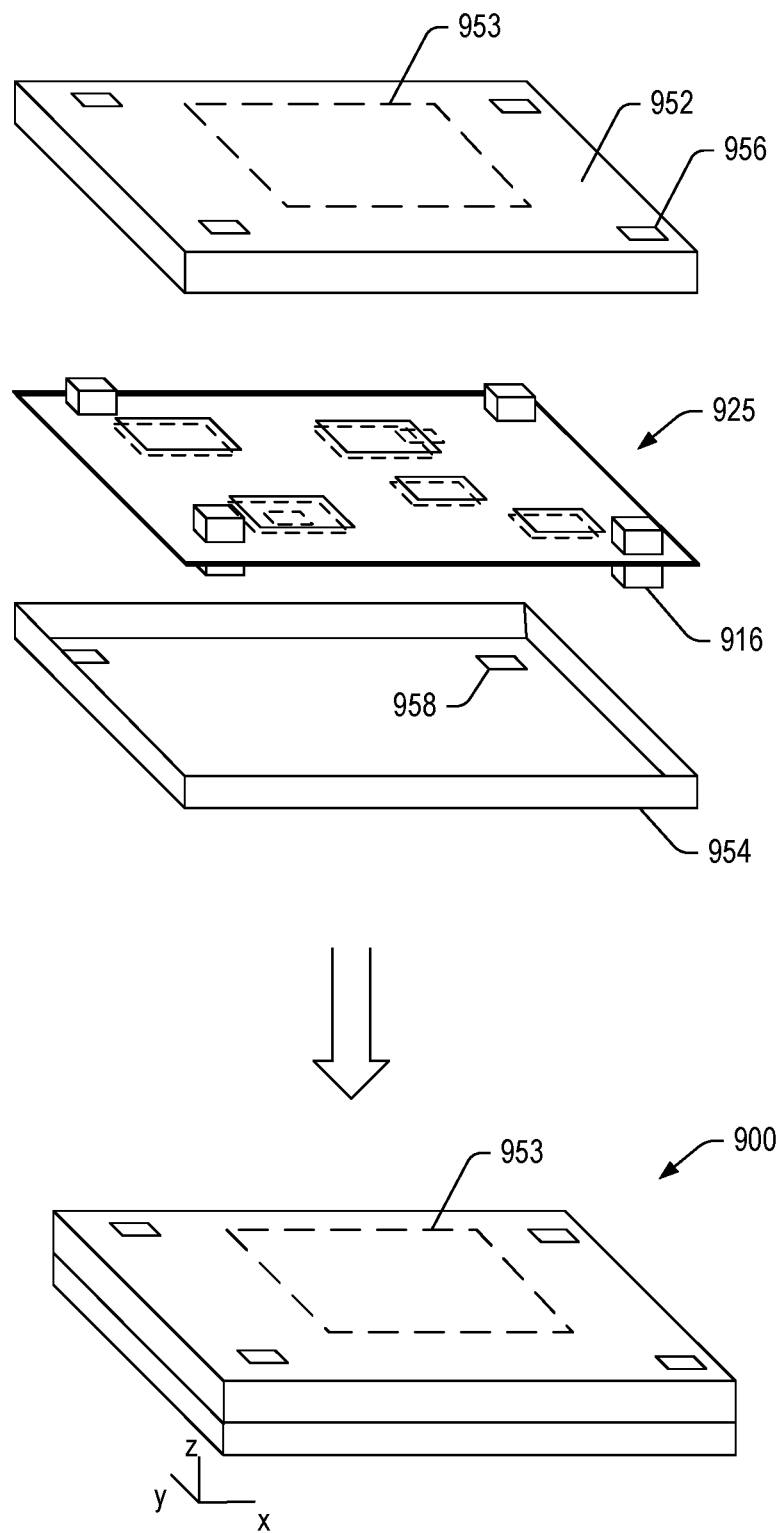
FIG. 10 is a series of views of the circuitry structure with respect to covers that form an example of an electronic device.

FIG. 10 shows a cover or shell 952 and a cover or shell 954 where the shell 952 and the shell 954 can be connected to the structural layer 915 of the circuitry structure 925, for example, via the connectors 916. As an example, the cover or shell 952 may include a display 953 (e.g., or display glass, etc.). As an example, the cover or shell 952 may include couplings 956 and the cover or shell 954 may include couplings 958. In such an example, the couplings 956 and 958 may be utilized to couple the shell 952 and the shell 954 to the structural layer 915, for example, via the connectors 916. As shown in FIG. 9, the various pieces can be assembled to form a device 900.

Figure 11:
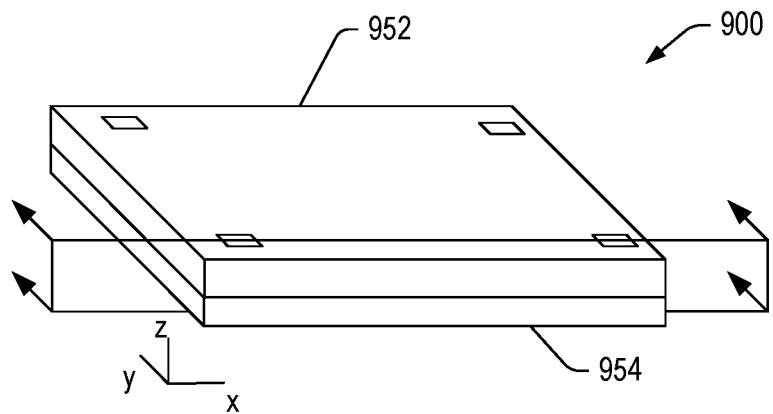
FIG. 11 is a perspective view and a cross-sectional view of the electronic device of FIG. 10.
Figure 11:
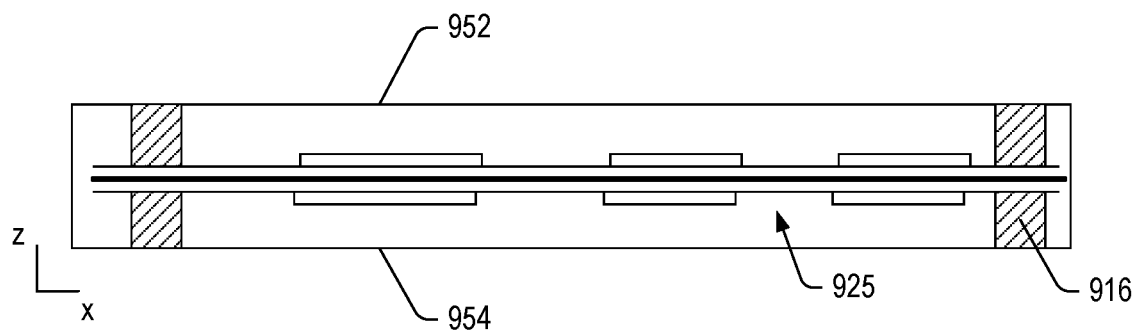

FIG. 11 shows an example of the device 900 along with a cross-sectional view. As shown, the circuitry structure 925 includes the structural layer 915, which is used to support circuitry and the covers or shells 952 and 954.

In terms of a method of assembly, the device 900 is assembled using a sub-assembly, which is shown to be the circuitry structure 925 that includes the structural layer. As an example, such a circuitry structure can be provided as a completed sub-assembly from a production line. In such an example, a device may be completed by attaching one or more components to the circuitry structure (e.g., sub-assembly) and/or by encasing at least a portion of the circuitry structure in a polymeric material (e.g., optionally a polymeric composite material).

Figure 12:
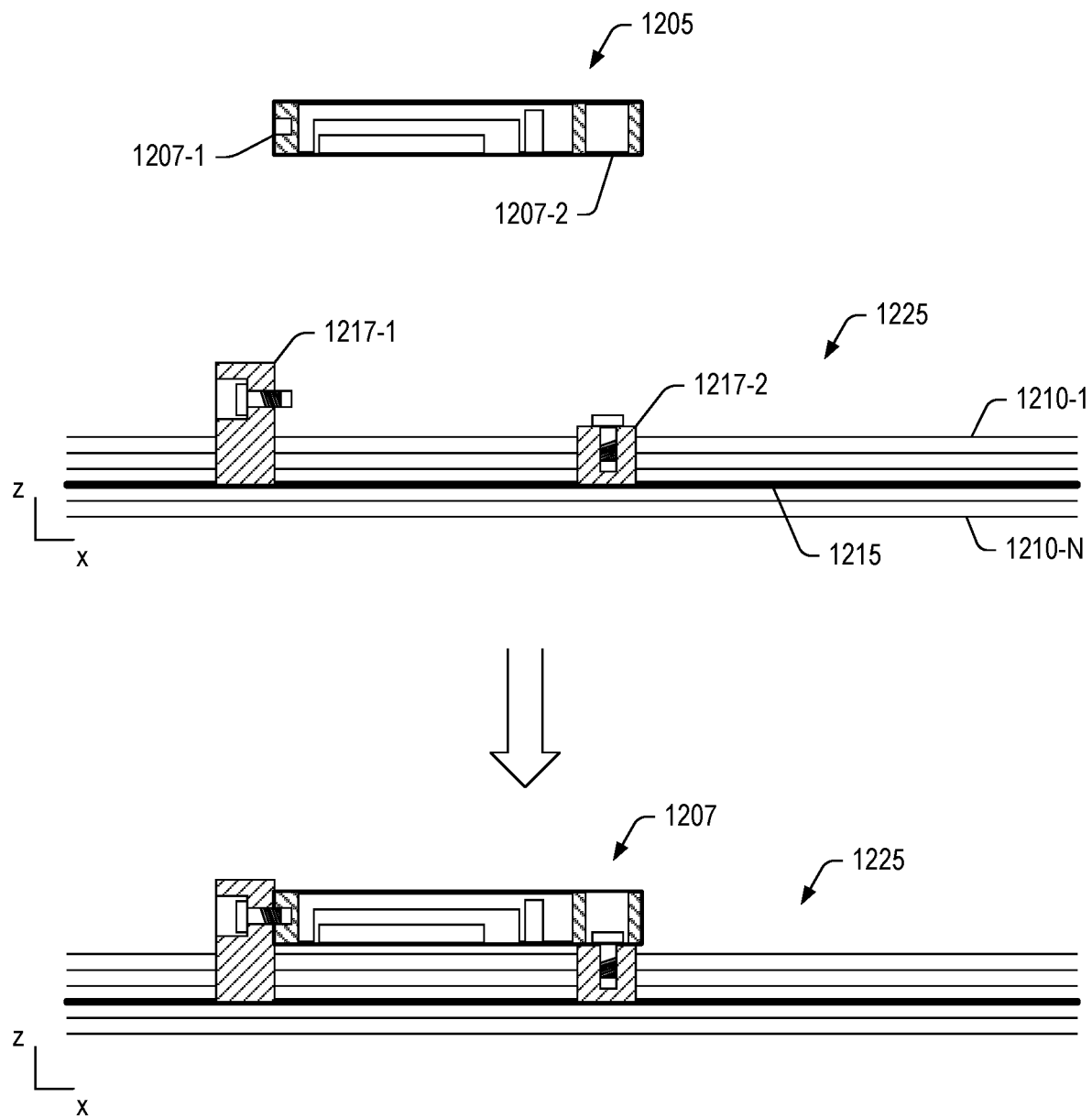
FIG. 12 is a series of views of an example of a circuitry structure that includes a structural layer and at least on mounts for mounting a component.

FIG. 12 shows an example of a component 1205 that can be attached to a circuitry structure 1225 that includes a structural layer 1215 that is disposed between a plurality of circuit boards 1210-1 to 1210-N. As shown in the example of FIG. 12, the component 1205 can include one or more mounts 1207-1 and 1207-2 and the circuitry structure 1225 can include one or more corresponding mounts 1217-1 and 1217-2. As an example, the component 1205 can be structurally coupled to the structural layer 1215 via the mounts 1207-1 and 1217-1 and/or the mounts 1207-2 and 1217-2.

Figure 13:
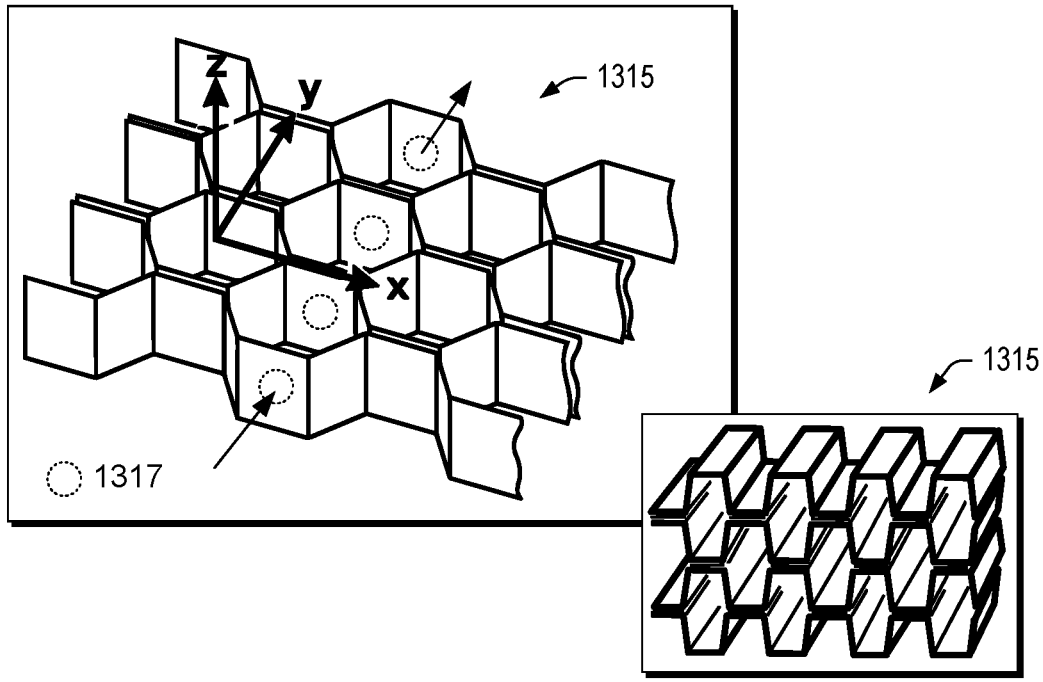
FIG. 13 is a series of views of examples of structural layers.
Figure 13:
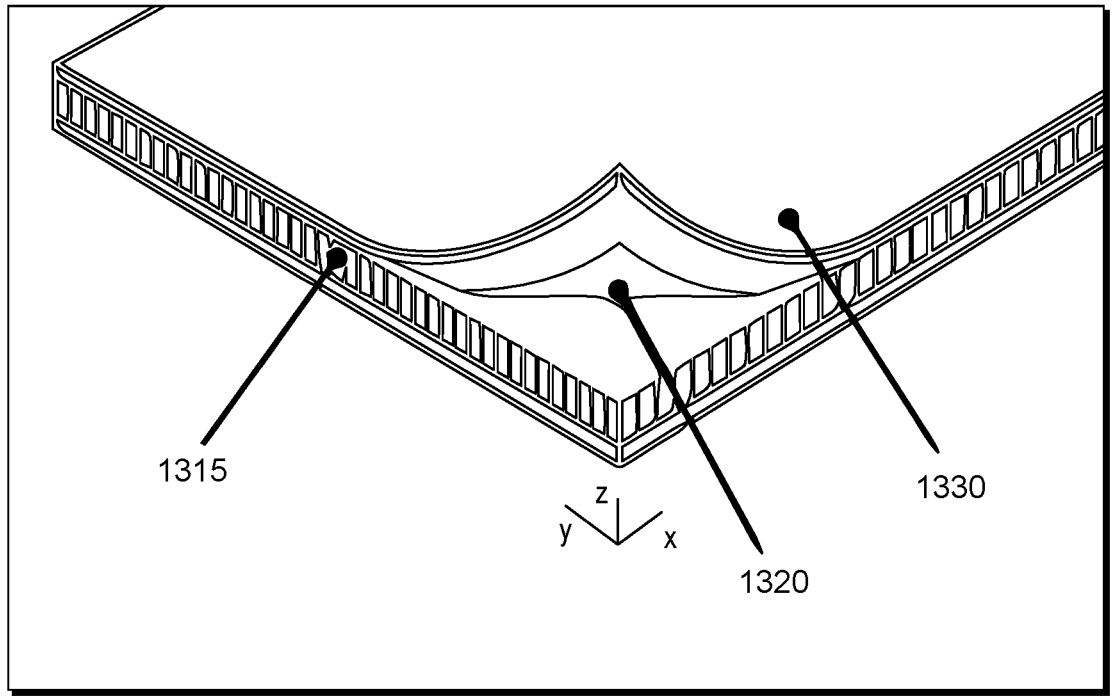

FIG. 13 shows an example of a structural layer 1315 that includes cells. For example, consider a honeycomb cell structure. Such a cell structure may impart desirable physical properties. For example, cells may increase bending strength of the structural layer 1315. As an example, cells may allow for passage of wires, connectors, etc. As an example, cells may create air spaces.

As an example, cell walls may include openings that allow for air flow. In the example of FIG. 13, the structural layer 1315 is shown with optional example openings 1317 in dotted lines. As an example, such openings may be directional. For example, where a device is to be oriented in a direction with respect to gravity, buoyancy may result in convective flow of air in a direction counter to that of gravity. For example, consider a tablet device that includes a stand that can orient the tablet device at an angle of about 45 degrees to about 90 degrees. In such an example, where a structural layer includes openings, passages, etc., air may be heated by operation of the device where the heated air becomes less dense and flows upwardly through the openings, passages, etc. In such an example, the structural layer can be a heat transfer layer, which may be passive. As an example, a device may include an air mover (e.g., a fan) where the air mover promotes flow through a structural layer (e.g., optionally directionally, etc.).

As an example, the structural layer 1315 can be covered at least in part by an adhesive 1320, which may be an adhesive for a skin material 1330. For example, consider a metal or metal alloy structural layer with cells where an adhesive is applied to adhere a skin material to the structural layer. As an example, an adhesive may be utilized to adhere a circuit board to the structural layer (e.g., indirectly via the adhesive).

As an example, a structural layer may be a conductor, for example, made of electrically conductive material, and/or may include a skin material or skin materials that is or are electrically conductive material. In such examples, the structural layer and/or skin thereof may serve as a ground plane. In printed circuit boards, a ground plane may be a large area of copper foil on the board which is connected to the power supply ground terminal and serves as a return path for current from different components on the board.

As an example, a structural layer can include a cellular material layer and one or more skin layers. In Jan et al., Flexural strength of honey comb sandwich structures", Int. Journal of Applied Sciences and Engineering Research, Vol. 4, Issue 1, 2015, data are presented for an aluminum honeycomb core material (e.g., as a cellular material layer) and glass fiber face sheets (e.g., as skin layers) with a total thickness of about 14 mm (13 mm core and 0.5 mm per face sheet). Test specimens of 200 mm length and 28 mm width were subject to a 3-point test. Results showed a maximum load of 0.92 kN (920 N) with a deflection of about 0.7 mm where core buckling occurred at failure.

Table 3 shows some example modulus of elasticity data as to aluminum, which may be compared to the data of Table 2.

TABLE 3

Example Data of Aluminum

| Metal | GPa |
| --- | --- |
| Aluminum Alloy 1100 | 69 |
| Aluminum Alloy 2024 | 72.4 |
| Aluminum Alloy 6061 | 69 |
| Aluminum Alloy 7075 | 71 |
| Aluminum Alloy 356.0 | 72.4 |

As an example, a structural layer can include a material that is stronger than aluminum (see, e.g., one or more materials of Table 2, etc.), such a material may be formed as a cellular material layer where one or more skin layers are affixed to the cellular material layer. In such an example, maximum load may exceed 920 N and deflection may be less than about 1 mm. As an example, a structural layer may be of a thickness less than about 15 mm or, for example, less than about 10 mm or, for example, less than about 5 mm. As an example, a structural layer may support a force of 250 N or more in a 3-point test where displacement at about 250 N is less than about 4 mm or, for example, less than about 2 mm or, for example, less than about 1 mm.

Figure 14:
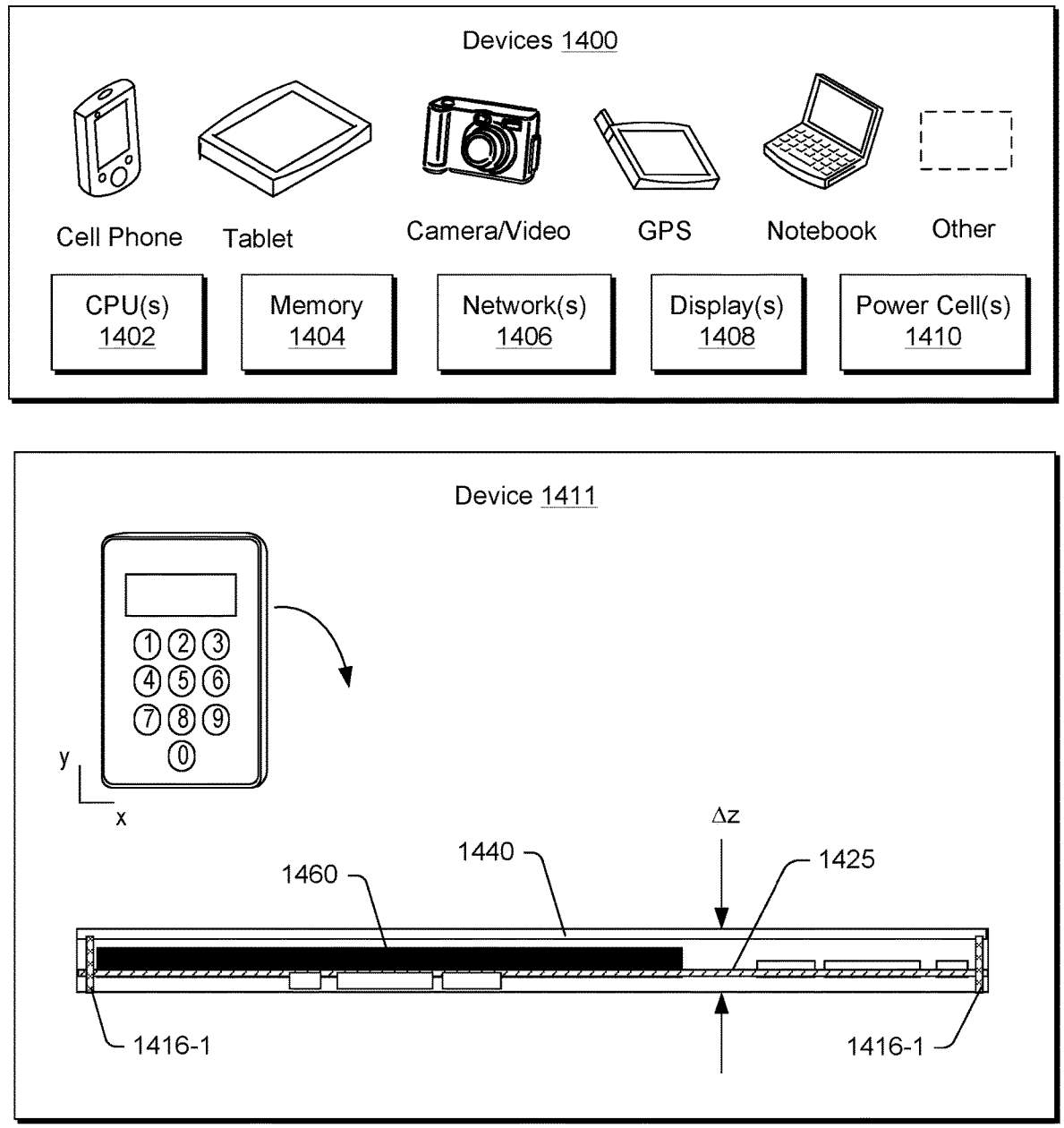
FIG. 14 is a diagram of examples of devices.

FIG. 14 shows some examples of devices 1400 that include components. As an example, one or more of the devices 1400 may be powered by a lithium-ion cell or cells (e.g., in the form of a lithium-ion battery or batteries). For example, a cell phone, a tablet, a camera, a GPS device, a notebook computer, or other device may be powered by a lithium-ion cell or cells. A device may be an automobile, a toy, a remote control device (e.g., a bomb sniffers, drones, etc.), etc. A device may include one or more processors 1402, memory 1404, one or more network interfaces 1406, one or more displays 1408 and, as a power source, for example, one or more lithium-ion cells 1410.

As an example, a device 1411 may include a circuitry structure 1425 that includes a structural layer and connectors 1416-1 and 1416-2, a display 1440 (e.g., with display glass), and a power cell(s) 1460. In such an example, the thickness of the device 1411 between the display 1440 and a housing material (see $\Delta z$) may be determined largely by a thickness of the power cell(s) 1460. As an example, a structural layer may include an opening where a power cell or power cells are disposed at least in part in the opening. In such an example, the thickness may be reduced compared to an example where the power cell or power cells are disposed to one side or to another side of the structural layer.

As an example, a device can include a structural layer; a first glass-reinforced epoxy circuit board mounted to one side of the structural panel; a second glass-reinforced epoxy circuit board mounted to an opposing side of the structural panel; components where the components include a processor, memory operatively coupled to the processor and a display operatively coupled to the processor; and a housing material supported by the structural layer. In such an example, the structural layer can include carbon such as, for example, graphene. As an example, a structural layer can include at least one transition metal. For example, a structural layer can include one or more metals, which may be in the form of a metallic material such as, for example, a relatively pure metal material or an alloy (e.g., an alloy material).

As an example, a structural layer can include cells such as cells of a cellular material. In such an example, the cellular material may be a metal, an alloy, or a composite material. As an example, cells can include wall openings. For example, a wall that defines a cell can include one or more openings. As an example, a hexagonal cell can include six walls where one or more of the walls can include one or more openings.

As an example, a device can include a structural layer; a first glass-reinforced epoxy circuit board mounted to one side of the structural panel; a second glass-reinforced epoxy circuit board mounted to an opposing side of the structural panel; components where the components include a processor, memory operatively coupled to the processor and a display operatively coupled to the processor; and a housing material supported by the structural layer. In such an example, the structural layer can have a modulus of elasticity greater than approximately 50 GPa. As an example, a housing material can be or include a polymeric material. As an example, such a polymeric material can be bonded to a structural layer. As an example, housing material can be or form a shell connected to a structural layer.

As an example, a device can include a structural layer; a first glass-reinforced epoxy circuit board mounted to one side of the structural panel; a second glass-reinforced epoxy circuit board mounted to an opposing side of the structural panel; components where the components include a processor, memory operatively coupled to the processor and a display operatively coupled to the processor; and a housing material supported by the structural layer. In such an example, the device can have a maximum a thickness of less than approximately 10 mm. For example, such a device may be a substantially rectangular device that can be defined by a length and a width of a rectangle where a thickness between opposing sides is less than approximately 10 mm.

As an example, in a device, a structural layer can be or include a ground plane. As an example, a structural layer can include at least one post where, for example, a device can include a component connected to a post where the post is connected to the structural layer. As an example, one or more posts may be utilized to transfer a load or loads applied to a shell, an outer surface, etc., to a structural layer. For example, where a shell is attached to a structural layer via posts, force applied to the shell may be transferred to the structural layer in a manner that does not directly transfer load to a printed circuit board (PCB) that may be coupled to the structural layer. In such an example, the structural layer can be utilized as a structural core that can carry and bear loads applied to a surface of an electronic device with reduced risk of damage to a circuitry of a printed circuit board (PCB), as may include FR4 as a support substrate.

As an example, a device can include a display glass where the display glass forms, at least in part, a first side of the device and where housing material forms, at least in part, a second, opposing side of the device. As an example, a structural layer may be coupled to a shell of an electronic device that includes display glass where force can be transferred from the shell to the structural layer, which can help to reduce risk of damage to the display glass. As an example, a structural layer may be utilized as a support for display glass, for example, in a stacked orientation where the display glass and a display are stacked on the structural layer (e.g., with little to no space between the display glass, display and a surface of the structural layer). In such an example, force applied to the display glass can be transferred to the structural layer, which can help to prevent displacement, flexing, etc., of the display glass and/or the display. In such an example, the display can include printed circuitry or other type of display circuitry (e.g., electrodes, etc.), which may include a FR4 or other support substrate. In such an example, the display can be mounted to one side of the structural layer and another circuitry board can be mounted to the other side of the structural layer.

As an example, a device can include a lithium-ion battery mounted to a structural layer. As an example, a structural layer can help to protect a lithium-ion battery from force applied to an electronic device. For example, a lithium-ion battery may be disposed between a structural layer and a shell where, for example, posts or other supports can transfer force applied to the shell to the structural layer such that the lithium-ion battery is protected from application of the force. As an example, a lithium-ion battery may be a pouch style battery (e.g., with a laminated flexible pouch) or may be another style.

As an example, a device can include a structural layer; a first circuit board mounted to one side of the structural panel; a second circuit board mounted to an opposing side of the structural panel; components where the components include a processor, memory operatively coupled to the processor and a display operatively coupled to the processor; and a housing material supported by the structural layer. In such an example, the device may be one or more of a tablet and a smart phone. As an example, device can be at least a portion of a clamshell computer. For example, such a device can be a portion of a laptop clamshell computer.

As an example, a method can include building a structural matrix into a core of working components of an electronic device such as, for example, a printed circuit board or printed circuit boards, a battery or batteries, a display screen or display screens. As an example, a structural lattice may be made from a relatively rigid material that can be laminated with one or more other layers, which may be an interior layer or a surface layer of a laminated structure. As an example, a laminated structural assembly can include wires that connect to one or more peripheral ports and/or one or more sensors where such wires may pass through one or more holes in a lattice of a laminated structural assembly and/or exit at one or more edges of a laminated structural assembly.

As an example, a cover of a device may be made of one or more materials that are attached to a structural layer, which may be a rigid board structure. In such an example, the cover may aim to keep out dust, provide for an amount of impact resistance, provide for device aesthetics and/or provide for device ergonomics (e.g., gripping, touch feel, etc.).

As an example, a device can include an external cover that may be metallized. In such an example, the cover may act as a Faraday cage around various electronics. As an example, a cover may be partially metallized and partially transparent to a particular range of electromagnetic energy such as, for example, a range associated with wireless communication circuitry. As an example, a cover may include one or more solid metallic portions and/or one or more mesh metallic portions.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 15:
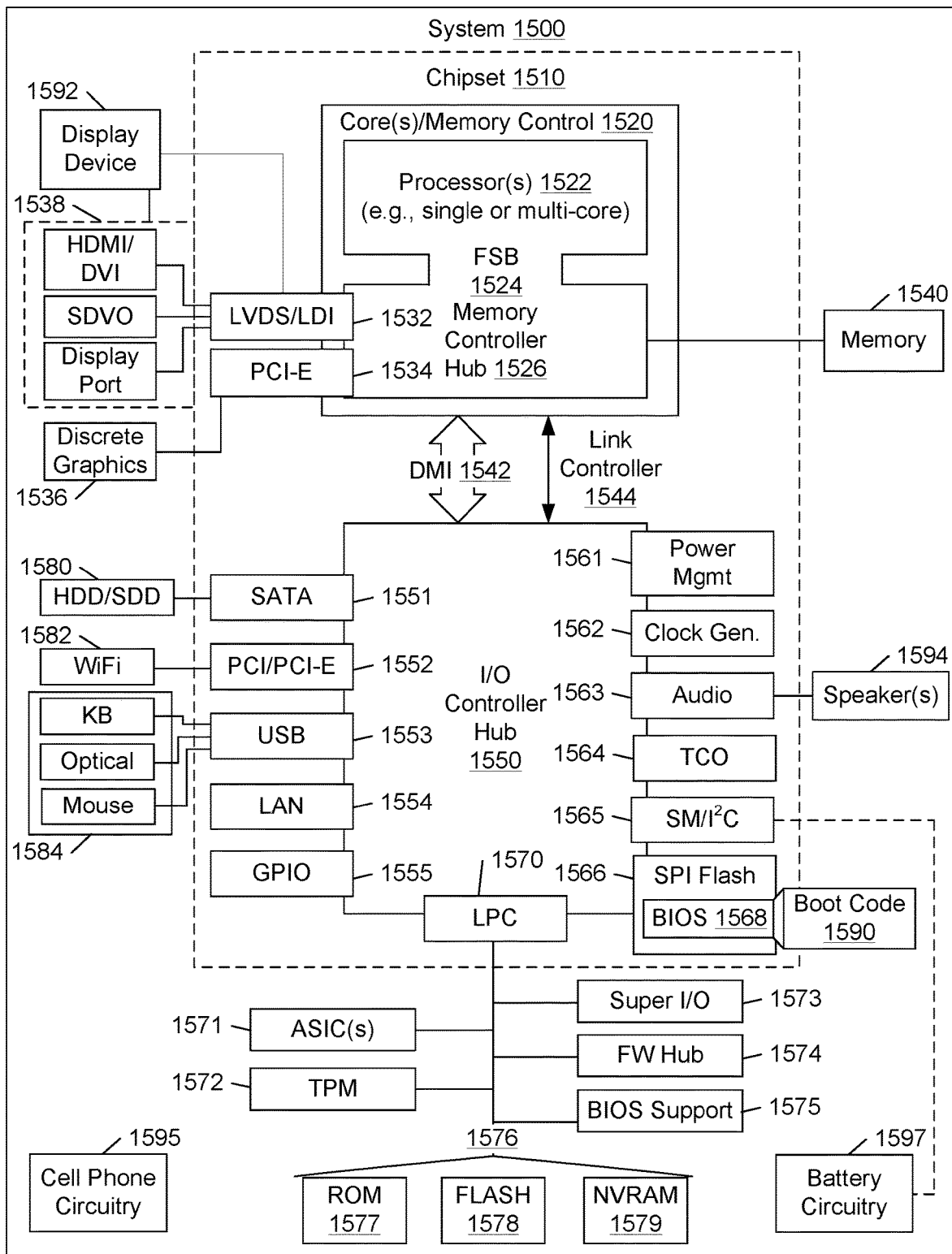
FIG. 15 is a diagram of an example of a system that includes one or more processors.

While various examples of circuits or circuitry have been discussed, FIG. 15 depicts a block diagram of an illustrative computer system 1500. The system 1500 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1500. As described herein, a device such as one of the devices 1400 of FIG. 14 may include at least some of the features of the system 1500.

As shown in FIG. 15, the system 1500 includes a so-called chipset 1510. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 15, the chipset 1510 has a particular architecture, which may vary to some extent depending on brand or manufacturer. The architecture of the chipset 1510 includes a core and memory control group 1520 and an I/O controller hub 1550 that exchange information (e.g., data, signals, commands, etc.) via, for example, a direct management interface or direct media interface (DMI) 1542 or a link controller 1544. In the example of FIG. 15, the DMI 1542 is a chip-to-chip interface (sometimes referred to as being a link between a "northbridge" and a "southbridge").

The core and memory control group 1520 include one or more processors 1522 (e.g., single core or multi-core) and a memory controller hub 1526 that exchange information via a front side bus (FSB) 1524. As described herein, various components of the core and memory control group 1520 may be integrated onto a single processor die, for example, to make a chip that supplants the conventional "northbridge" style architecture.

The memory controller hub 1526 interfaces with memory 1540. For example, the memory controller hub 1526 may provide support for DDR SDRAM memory (e.g., DDR, DDR2, DDR3, etc.). In general, the memory 1540 is a type of random-access memory (RAM). It is often referred to as "system memory".

The memory controller hub 1526 further includes a low-voltage differential signaling interface (LVDS) 1532. The LVDS 1532 may be a so-called LVDS Display Interface (LDI) for support of a display device 1592 (e.g., a CRT, a flat panel, a projector, etc.). A block 1538 includes some examples of technologies that may be supported via the LVDS interface 1532 (e.g., serial digital video, HDMI/DVI, display port). The memory controller hub 1526 also includes one or more PCI-express interfaces (PCI-E) 1534, for example, for support of discrete graphics 1536. Discrete graphics using a PCI-E interface has become an alternative approach to an accelerated graphics port (AGP). For example, the memory controller hub 1526 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1550 includes a variety of interfaces. The example of FIG. 15 includes a SATA interface 1551, one or more PCI-E interfaces 1552 (optionally one or more legacy PCI interfaces), one or more USB interfaces 1553, a LAN interface 1554 (more generally a network interface), a general purpose I/O interface (GPIO) 1555, a low-pin count (LPC) interface 1570, a power management interface 1561, a clock generator interface 1562, an audio interface 1563 (e.g., for speakers 1594), a total cost of operation (TCO) interface 1564, a system management bus interface (e.g., a multi-master serial computer bus interface) 1565, and a serial peripheral flash memory/controller interface (SPI Flash) 1566, which, in the example of FIG. 15, includes BIOS 1568 and boot code 1590. With respect to network connections, the I/O hub controller 1550 may include integrated gigabit Ethernet controller lines multiplexed with a PCI-E interface port. Other network features may operate independent of a PCI-E interface.

The interfaces of the I/O hub controller 1550 provide for communication with various devices, networks, etc. For example, the SATA interface 1551 provides for reading, writing or reading and writing information on one or more drives 1580 such as HDDs, SDDs or a combination thereof. The I/O hub controller 1550 may also include an advanced host controller interface (AHCI) to support one or more drives 1580. The PCI-E interface 1552 allows for wireless connections 1582 to devices, networks, etc. The USB interface 1553 provides for input devices 1584 such as keyboards (KB), one or more optical sensors, mice and various other devices (e.g., microphones, cameras, phones, storage, media players, etc.). On or more other types of sensors may optionally rely on the USB interface 1553 or another interface (e.g., I²C, etc.). As to microphones, the system 1500 of FIG. 15 may include hardware (e.g., audio card) appropriately configured for receipt of sound (e.g., user voice, ambient sound, etc.).

In the example of FIG. 15, the LPC interface 1570 provides for use of one or more ASICs 1571, a trusted platform module (TPM) 1572, a super I/O 1573, a firmware hub 1574, BIOS support 1575 as well as various types of memory 1576 such as ROM 1577, Flash 1578, and non-volatile RAM (NVRAM) 1579. With respect to the TPM 1572, this module may be in the form of a chip that can be used to authenticate software and hardware devices. For example, a TPM may be capable of performing platform authentication and may be used to verify that a system seeking access is the expected system.

The system 1500, upon power on, may be configured to execute boot code 1590 for the BIOS 1568, as stored within the SPI Flash 1566, and thereafter processes data under the control of one or more operating systems and application software (e.g., stored in system memory 1540). An operating system may be stored in any of a variety of locations and accessed, for example, according to instructions of the BIOS 1568. Again, as described herein, a satellite, a base, a server or other machine may include fewer or more features than shown in the system 1500 of FIG. 15. Further, the system 1500 of FIG. 15 is shown as optionally include cell phone circuitry 1595, which may include GSM, CDMA, etc., types of circuitry configured for coordinated operation with one or more of the other features of the system 1500. Also shown in FIG. 15 is battery circuitry 1597, which may provide one or more battery, power, etc., associated features (e.g., optionally to instruct one or more other components of the system 1500). As an example, a SMBus may be operable via a LPC (see, e.g., the LPC interface 1570), via an I²C interface (see, e.g., the SM/I²C interface 1565), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:
1. A device comprising:
a structural layer that comprises a first side surface, an opposing, second side surface, an opening, and connectors;
a first glass-reinforced epoxy circuit board mounted to the first side surface of the structural layer;

a second glass-reinforced epoxy circuit board mounted to the opposing, second side surface of the structural layer;

components wherein the components comprise a processor, memory operatively coupled to the processor, a flexible pouch lithium-ion battery, and a display operatively coupled to the processor, wherein the flexible pouch lithium-ion battery is disposed at least in part in the opening of the structural layer and operatively coupled to the processor, the memory, and the display;

a housing material supported by the structural layer wherein the housing material comprises couplings that couple directly to the connectors of the structural layer that transfer force applied to the housing material to the structural layer to protect the flexible pouch lithium-ion battery from the force applied to the housing material; and display glass wherein the display glass forms, at least in part, a first side of the device, wherein the housing material forms, at least in part, a second, opposing side of the device, and wherein a thickness of the device between the first side and the second, opposing side is less than 10 mm.

2. The device of claim 1 wherein the structural layer comprises carbon.

3. The device of claim 1 wherein the structural layer comprises graphene.

4. The device of claim 1 wherein the structural layer comprises at least one transition metal.

5. The device of claim 1 wherein the structural layer comprises cells.

6. The device of claim 5 wherein the cells are defined by walls wherein at least a portion of the walls comprise wall openings.

7. The device of claim 5 wherein the cells comprise hexagonal cells.

8. The device of claim 1 wherein the structural layer comprises a modulus of elasticity greater than 50 GPa.

9. The device of claim 1 wherein the housing material comprises a polymeric material.

10. The device of claim 9 wherein the polymeric material is bonded to the structural layer.

11. The device of claim 1 wherein the housing material comprises a shell connected to connectors of the structural layer.

12. The device of claim 1 wherein the structural layer comprises a ground plane.

13. The device of claim 1 wherein the connectors of the structural layer comprise at least one post.

14. The device of claim 1 comprising a component connected to a post wherein the post is connected to the structural layer.

15. The device of claim 1 wherein the flexible pouch lithium-ion battery is mounted to the structural layer.

16. The device of claim 1 comprising a tablet.

17. The device of claim 1 comprising a smart phone.

18. The device of claim 1 comprising at least a portion of a clamshell computer.

19. The device of claim 1 wherein the structural layer comprises a thickness less than 5 mm.

20. The device of claim 1 wherein the thickness of the device between the first side and the second, opposing side depends largely on a thickness of the flexible pouch lithium-ion battery.

* * * * *